M. RANDOLPH.

Assignor to THE RANDOLPH MANUFACTURING COMPANY.

JOURNAL BEARING.

No. 10,794. Reissued Jan. 4, 1887.

WITNESSES:

W. J. Graham.
Eugene H. Randolph

INVENTOR

Mahlon Randolph

UNITED STATES PATENT OFFICE.

MAHLON RANDOLPH, OF NEW YORK, N. Y., ASSIGNOR TO THE RANDOLPH MANUFACTURING COMPANY, OF NEW YORK.

JOURNAL-BEARING.

SPECIFICATION forming part of Reissued Letters Patent No. 10,794, dated January 4, 1887

Original No. 349,056, dated September 14, 1886. Application for reissue filed November 18, 1886. Serial No. 219,320.

*To all whom it may concern:*

Be it known that I, MAHLON RANDOLPH, of the city, county, and State of New York, have invented a new and useful Improvement in Journal-Bearings; and I hereby declare the following to be a full and clear description thereof.

This invention relates to that class of journal bearings or other bearings for any form of moving machinery in which the bearing proper is formed of an anti-friction compound, the use of which, while it forms a sufficiently hard and durable bearing, obviates the necessity of using any lubricant to reduce the frictional resistance to the moving parts.

The invention will be readily understood by the subjoined specification, and by reference to the accompanying drawings, of which—

Figure 1:
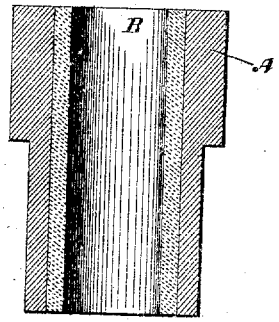
Figure 4:
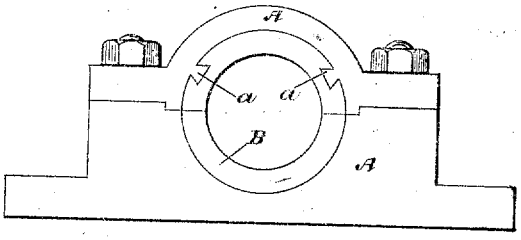
Figure 2:
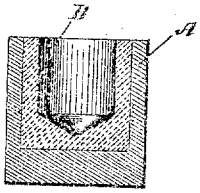
Figure 5:
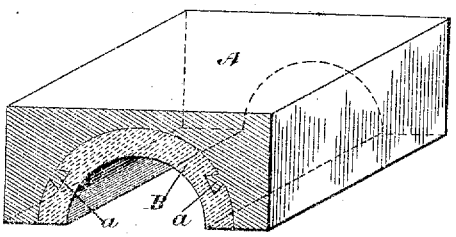
Figure 3:
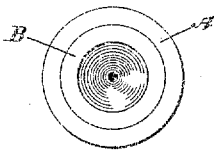

Figure 1 is a sectional elevation of the collar-bearing of a mill-spindle. Fig. 2 is a sectional elevation of the step of a mill-spindle. Fig. 3 is a plan view of the collar-bearing of the mill-spindle. Fig. 4 is an elevation of a pillow-block. Fig. 5 is an isometrical perspective view of a railway journal-bearing or similar structure.

In each of these bearings, or in any others adapted to carrying, sustaining, or guiding the moving parts of any form of machinery, the bearing is formed of a retaining-case, A, usually of metallic construction, and a bearing or wearing seat, B, which is formed of my improved anti-friction compound, as described below. In most cases the shell A, whether it be a spindle-collar or step-piece, a pillow block or bearing built in one or more pieces, or a simple journal-bearing, or any similar structure, is simply a metallic housing formed into the shape required, and adapted to receive and hold the bearing material B simply by frictional contact or the cohesion produced between the parts A and B by pressing the latter while in a plastic state into the seat prepared for it in the former. In some cases, however, this simple contact between the parts is inadequate to the purpose of holding them together, and in such cases I form one or more locking-pieces, *a*, on the contacting surface of the matrix-piece A, the said locking-piece *a* in each case being formed so as to lock and hold the material B tightly up to A, as shown by the dovetailed form in Figs. 4 and 5. These dovetailed locking-pieces may of course be either in the form of lugs or grooves.

The anti-friction compound is formed of paper-pulp or fiber mixed with an unctuous carbonaceous matter—such as very finely powdered graphite, mica, &c.—which acts as a durable lubricating medium, and an adhering substance in the form of an albumen for firmly cementing the two first-mentioned component parts into a homogeneous paste, which, when thoroughly incorporated, is pressed into a mold or form, or into the required shape in the shell when so desired.

Many former attempts to produce good and durable anti-friction bearings with plumbago or graphite as a durable lubricant, held in place by a fibrous substance and an adhering mixture, have been more or less successful; but the bearings so made have necessarily been to a certain extent crude and unsatisfactory by reason of the inaptitude to the purpose of the fibers used, these having been heretofore limited to such mineral substances as mineral wool, asbestus, and similar varieties of hornblende and pyroxene, and to animal hair or wool; but all such substances are adaptable to only a limited number of uses, owing to the harsh and unyielding nature of such fibers, which prevents their being pressed into the finer forms of bearings, and the absence from them of sufficient firmness of substance to endure cutting or trimming after having been pressed into the desired form has rendered journal or similar bearings so formed of impossible adaptation to many forms of bearings, and more or less unsuitable for all or any bearings. Another difficulty heretofore experienced in the construction of bearings of this class has been found in the adhering substance used, such materials as liquid silicate of soda and various adhering gums having been used, each of which has shown the want of something better for the purpose, as the silicate caused the bearing to rust when standing idle, and the gums being of insufficient binding or adhesive strength to produce the solidity of structure required. These difficulties have been found to be wholly met and overcome in the present invention. The paper pulp or fiber I use is taken from any suitable paper-stock having sufficient firmness and tensile strength, and with this I mix as much very finely powdered graphite as the mass of pulp or fiber will readily take up and hold together, and then mix with this mass as much strong albumen (preferably egg-albumen) as the mixture will require to thoroughly cement and hold together. The mass thus compounded is thoroughly mixed and incorporated together, so as to form a homogeneous mass. This mixing can best be done in a machine adapted to the purpose, and after the mass shall have been thoroughly incorporated together it is put into suitable molds or formers, or into the metallic shell designed to receive it and hold it in the form of any particular bearing, and then pressure is applied, so as to make the plastic material assume an exceedingly compact form, after which it is allowed to indurate; and this may be properly hastened by placing the said prepared bearings in a steam-heated room.

I do not claim as part of this invention the anti-friction material composed of fibrous material, plumbago, and albumen, but the means for holding the same in the metallic box.

After the bearings shall have become thoroughly dried and hardened in this manner they may be faced, cut, trimmed, bored, or reamed, so as to be nicely adjusted to any kind of bearings for moving machinery.

Having described my invention, I claim—

1. A journal or other machinery bearing formed of fibrous pulp mixed with finely-powdered graphite and an adhesive material, thoroughly incorporated by mixing, and pressed into a metallic casing provided with one or more dovetailed lugs or recesses for holding the compound bearing material to the metallic casing.

2. A journal-bearing formed of a metallic casing having ribs of the length of the bearing and an inner wearing-bushing of a plastic anti-friction material covering said ribs except at their ends, said ribs being adapted to receive end shocks, and also so shaped as to hold in place such plastic material, all substantially as described and set forth.

MAHLON RANDOLPH.

Witnesses:
EUGENE H. L. RANDOLPH,
BIRDIE A. RANDOLPH.